(12) United States Patent
Cross

(10) Patent No.: US 6,273,448 B1
(45) Date of Patent: Aug. 14, 2001

(54) TRAILER HITCH AND TONGUE ALIGNMENT SYSTEM

(76) Inventor: Lee Cross, 1290 Kings Chapel Rd. P.O. Box #48, Alpine, AL (US) 35014

( * ) Notice: Subject to any disclaimer, the term of this patent is extended or adjusted under 35 U.S.C. 154(b) by 0 days.

(21) Appl. No.: 09/641,840

(22) Filed: Aug. 18, 2000

(51) Int. Cl.7 ........................................................ B60D 1/01
(52) U.S. Cl. ............................................... 280/477; 33/264
(58) Field of Search ........................... 280/477, 400, 280/495, 504, 511; 33/264

(56) References Cited

U.S. PATENT DOCUMENTS

| D. 338,644 | 8/1993 | Winton . | |
|---|---|---|---|
| 3,702,029 | 11/1972 | Anderson, Jr. . | |
| 3,720,000 | * 3/1973 | Schlegel | 280/477 |
| 3,774,149 | 11/1973 | Bennett . | |
| 3,858,966 | * 1/1975 | Lowell, Jr. | 280/477 |
| 3,889,384 | * 6/1975 | White | 280/477 |
| 3,901,536 | 8/1975 | Black . | |
| 3,918,746 | * 11/1975 | Lehtisaari | 280/477 |
| 4,012,056 | * 3/1977 | Christensen | 280/477 |
| 4,054,302 | 10/1977 | Campbell . | |
| 4,552,376 | 11/1985 | Cofer . | |
| 4,723,788 | * 2/1988 | Suter | 280/477 |
| 5,113,588 | * 5/1992 | Walston | 280/477 |
| 5,269,554 | * 12/1993 | Law et al. | 280/477 |
| 5,927,229 | * 7/1999 | Karr, Jr. | 280/477 |

FOREIGN PATENT DOCUMENTS

934358 * 8/1963 (GB) ..................................... 280/477

* cited by examiner

Primary Examiner—Daniel G. DePumpo

(57) ABSTRACT

A trailer hitch and tongue alignment system for assisting a user in aligning a vehicle and trailer hitch. The trailer hitch and tongue alignment system includes a vehicle-mountable apparatus provided for mounting on a hitch ball support of a vehicle. The vehicle-mountable apparatus includes a first mount for mounting to the hitch ball support. A locator post is mounted to the first mount for extending in a substantially vertical orientation when the first mount is mounted on a hitch ball support. A light source is adapted for selectively shining light. The light source is mounted on an upper end of the locator post. A switch is designed for selectively activating the light source when the tongue of the trailer is located above the hitch ball of the hitch ball support. The switch is located on the locator post.

20 Claims, 4 Drawing Sheets

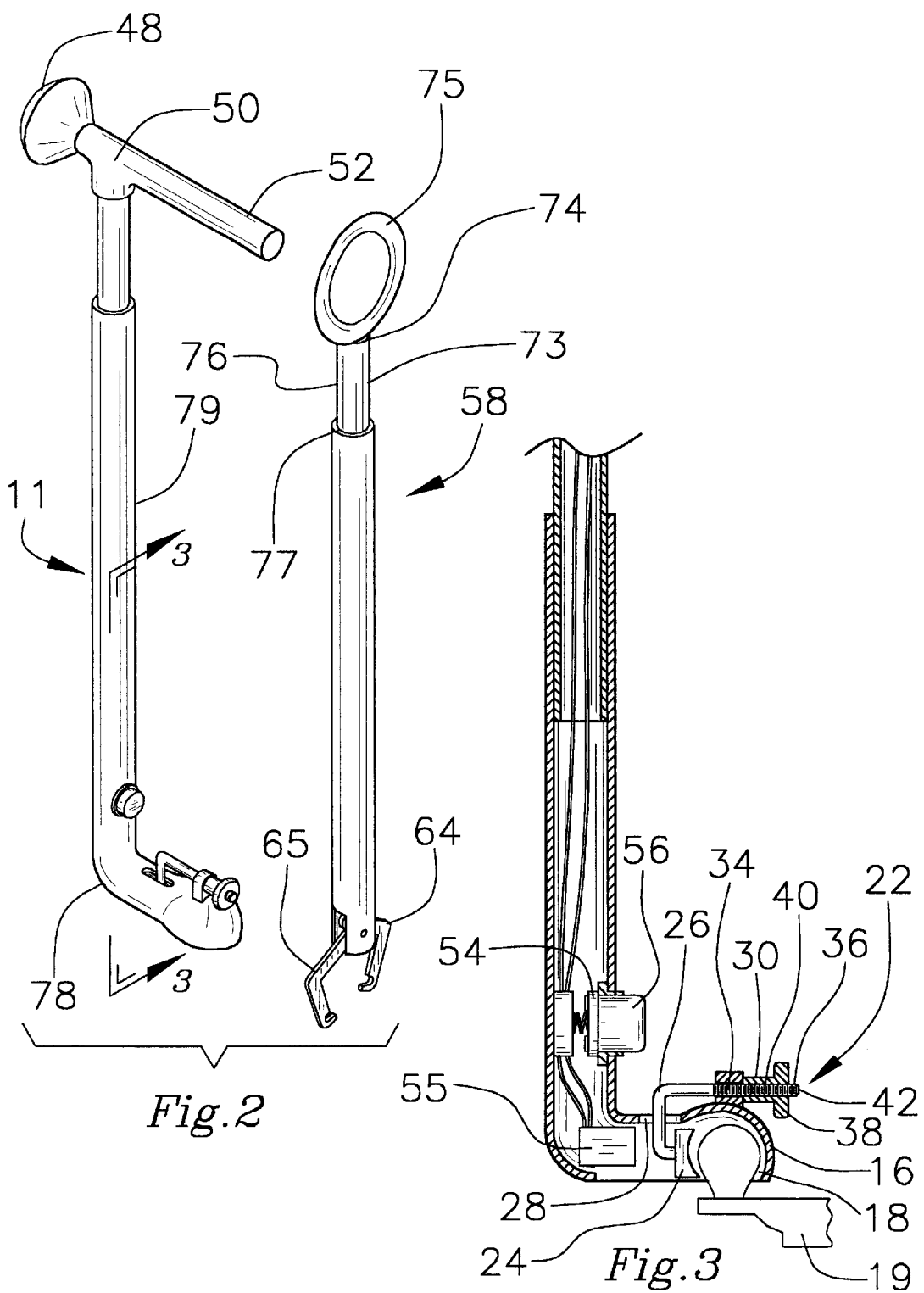

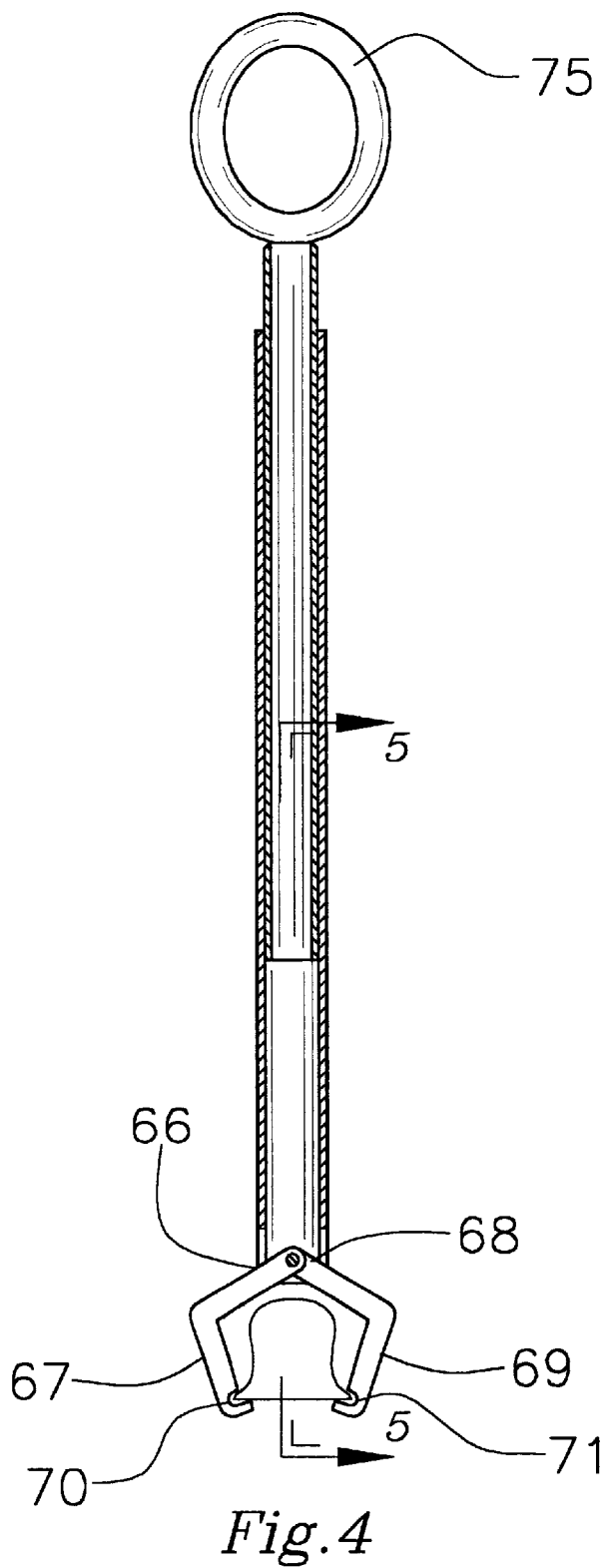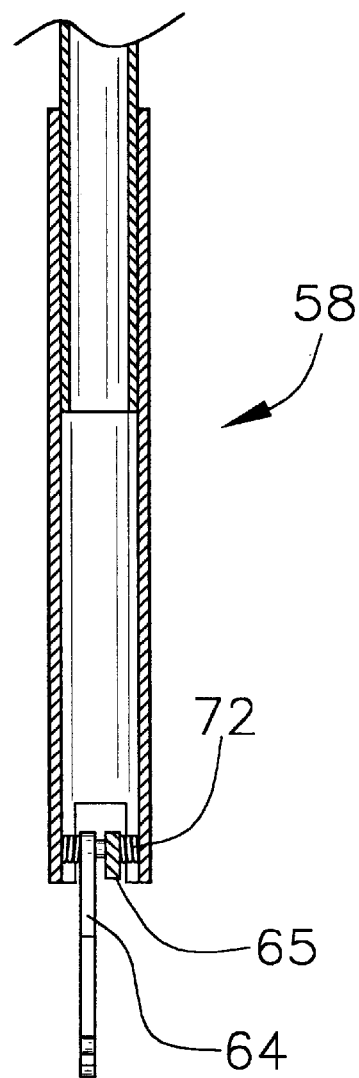

TRAILER HITCH AND TONGUE ALIGNMENT SYSTEM

BACKGROUND OF THE INVENTION

1. Field of the Invention

The present invention relates to trailer hitches and more particularly pertains to a new trailer hitch and tongue alignment system for assisting a user in aligning a vehicle and trailer hitch.

2. Description of the Prior Art

The use of trailer hitches is known in the prior art. More specifically, trailer hitches heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,552,376; 4,054,302; 3,774,149; 3,702,029; 3,901,536; and U.S. Pat. No. Des. 338,644.

While these devices fulfill their respective, particular objectives and requirements, the aforementioned patents do not disclose a new trailer hitch and tongue alignment system. The inventive device includes a vehicle-mountable apparatus provided for mounting on a hitch ball support of a vehicle. The vehicle-mountable apparatus includes a first mount for mounting to the hitch ball support. A locator post is mounted to the first mount for extending in a substantially vertical orientation when the first mount is mounted on a hitch ball support. A light source is adapted for selectively shining light. The light source is mounted on an upper end of the locator post. A switch is designed for selectively activating the light source when the tongue of the trailer is located above the hitch ball of the hitch ball support. The switch is located on the locator post.

In these respects, the trailer hitch and tongue alignment system according to the present invention substantially departs from the conventional concepts and designs of the prior art, and in so doing provides an apparatus primarily developed for the purpose of assisting a user in aligning a vehicle and trailer hitch.

SUMMARY OF THE INVENTION

In view of the foregoing disadvantages inherent in the known types of trailer hitches now present in the prior art, the present invention provides a new trailer hitch and tongue alignment system construction wherein the same can be utilized for assisting a user in aligning a vehicle and trailer hitch.

The general purpose of the present invention, which will be described subsequently in greater detail, is to provide a new trailer hitch and tongue alignment system apparatus and method which has many of the advantages of the trailer hitches mentioned heretofore and many novel features that result in a new trailer hitch and tongue alignment system which is not anticipated, rendered obvious, suggested, or even implied by any of the prior art trailer hitches, either alone or in any combination thereof.

To attain this, the present invention generally comprises a vehicle-mountable apparatus provided for mounting on a hitch ball support of a vehicle. The vehicle-mountable apparatus includes a first mount for mounting to the hitch ball support. A locator post is mounted to the first mount for extending in a substantially vertical orientation when the first mount is mounted on a hitch ball support. A light source is adapted for selectively shining light. The light source is mounted on an upper end of the locator post. A switch is designed for selectively activating the light source when the tongue of the trailer is located above the hitch ball of the hitch ball support. The switch is located on the locator post.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new trailer hitch and tongue alignment system apparatus and method which has many of the advantages of the trailer hitches mentioned heretofore and many novel features that result in a new trailer hitch and tongue alignment system which is not anticipated, rendered obvious, suggested, or even implied by any of the prior art trailer hitches, either alone or in any combination thereof.

It is another object of the present invention to provide a new trailer hitch and tongue alignment system which may be easily and efficiently manufactured and marketed.

It is a further object of the present invention to provide a new trailer hitch and tongue alignment system which is of a durable and reliable construction.

An even further object of the present invention is to provide a new trailer hitch and tongue alignment system which is susceptible of a low cost of manufacture with regard to both materials and labor, and which accordingly is then susceptible of low prices of sale to the consuming public, thereby making such trailer hitch and tongue alignment system economically available to the buying public.

Still yet another object of the present invention is to provide a new trailer hitch and tongue alignment system which provides in the apparatuses and methods of the prior art some of the advantages thereof, while simultaneously overcoming some of the disadvantages normally associated therewith.

Still another object of the present invention is to provide a new trailer hitch and tongue alignment system for assisting a user in aligning a vehicle and trailer hitch.

Yet another object of the present invention is to provide a new trailer hitch and tongue alignment system which includes a vehicle-mountable apparatus provided for mounting on a hitch ball support of a vehicle. The vehicle-mountable apparatus includes a first mount for mounting to the hitch ball support. A locator post is mounted to the first mount for extending in a substantially vertical orientation when the first mount is mounted on a hitch ball support. A light source is adapted for selectively shining light. The light source is mounted on an upper end of the locator post. A switch is designed for selectively activating the light source when the tongue of the trailer is located above the hitch ball of the hitch ball support. The switch is located on the locator post.

Still yet another object of the present invention is to provide a new trailer hitch and tongue alignment system that permits a user to back up a vehicle to a trailer for attaching the hitch and tongue without assistance from another person.

Even still another object of the present invention is to provide a new trailer hitch and tongue alignment system that permits a user to safely reverse a vehicle while aligning a hitch and tongue trailer system that provides a positive lighted indication that the hitch ball and hitch ball receiver are properly aligned for hitching.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic perspective view of the present invention.

FIG. 3 is a schematic sectional view taken along line 3—3 of FIG. 2 and particularly illustrating the vehicle-mounting apparatus of the invention.

FIG. 4 is a schematic sectional front view particularly illustrating the trailer-mountable apparatus of the invention.

FIG. 5 is a schematic sectional side view of the present invention taken along line 5—5 of FIG. 4.

DESCRIPTION OF THE PREFERRED EMBODIMENT

Figure 1:
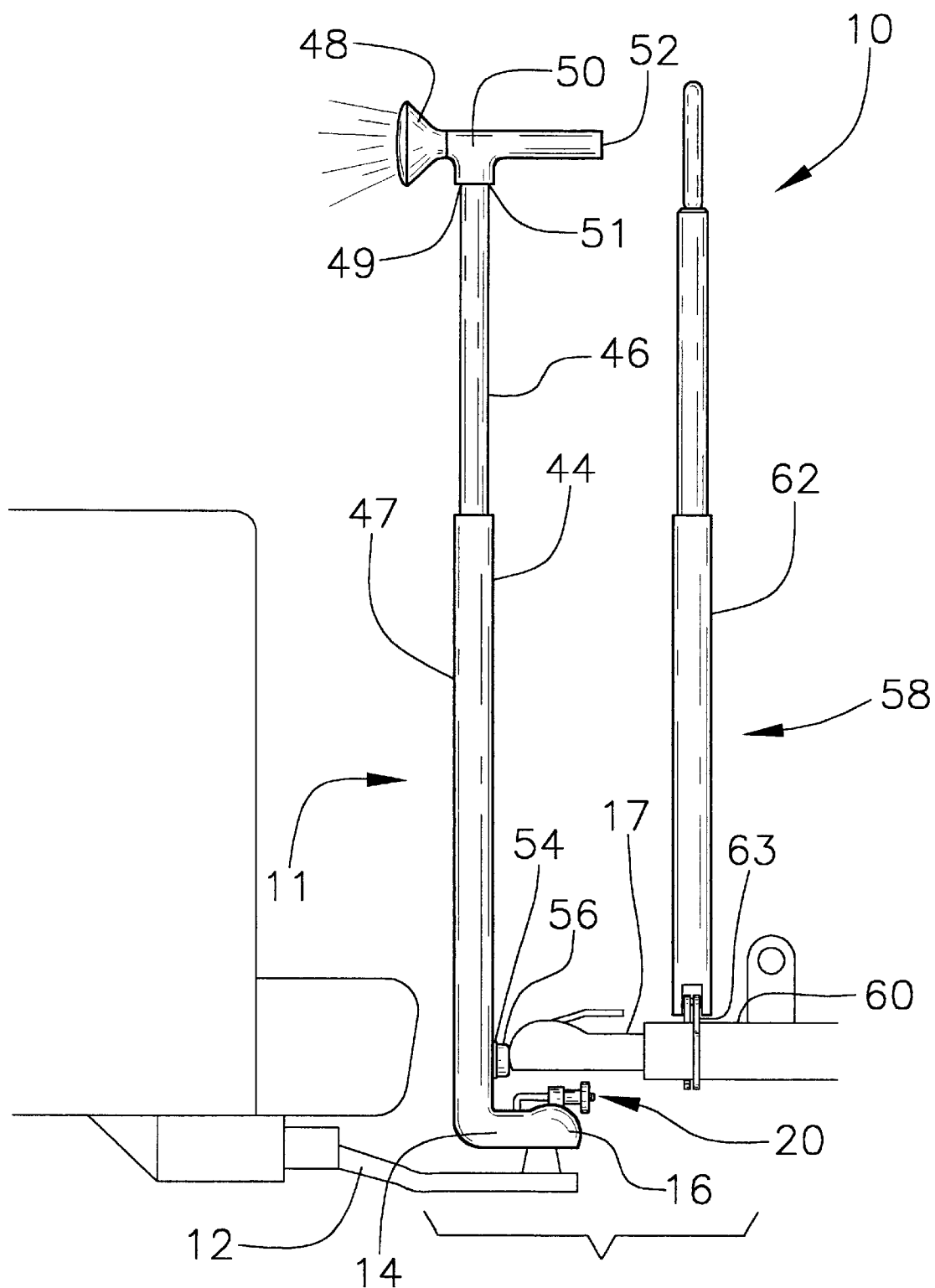
FIG. 1 is a schematic side view of a new trailer hitch and tongue alignment system according to the present invention.
Figure 6:
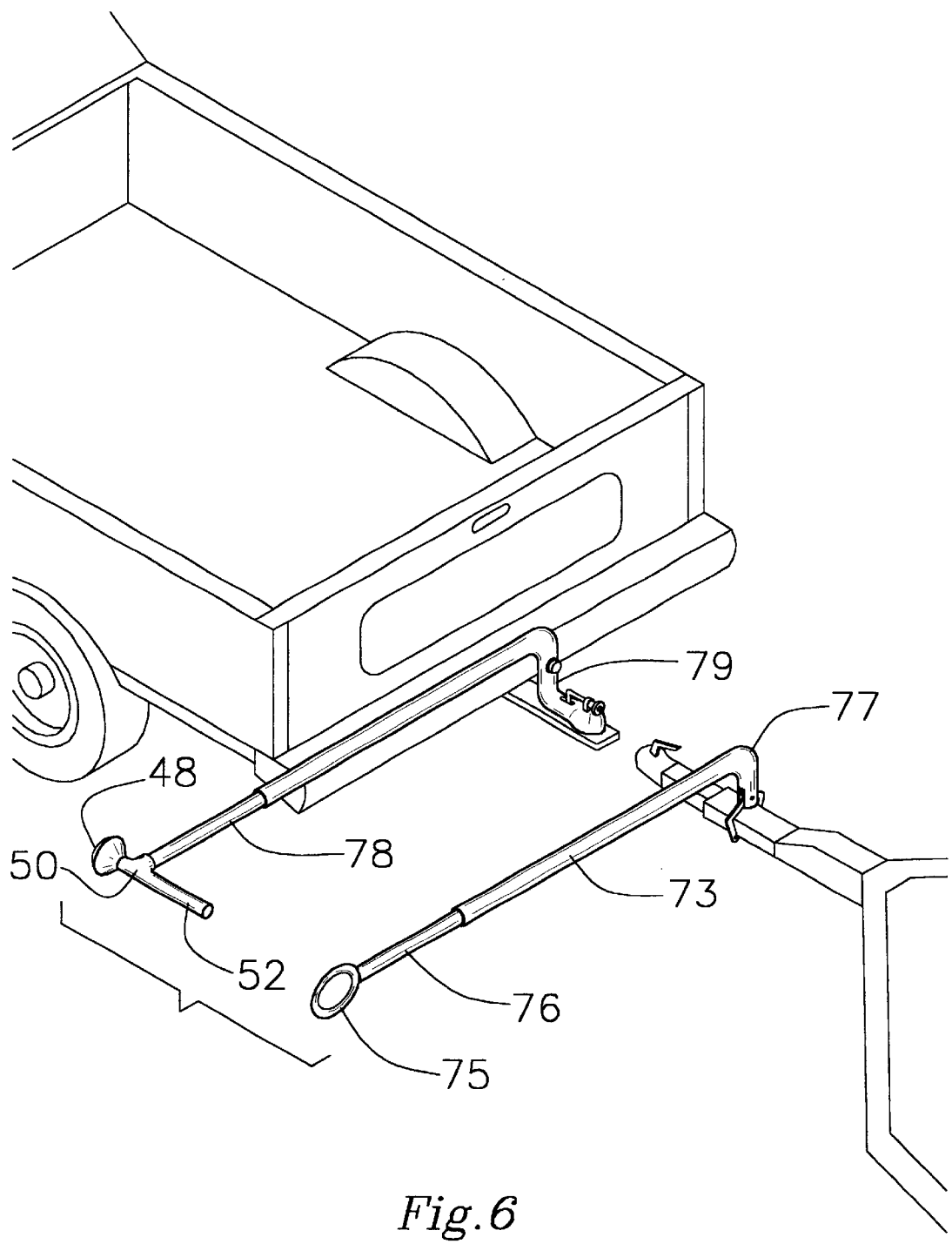
FIG. 6 is a schematic perspective view of an optional configuration of the present invention.

With reference now to the drawings, and in particular to FIGS. 1 through 6 thereof, a new trailer hitch and tongue alignment system embodying the principles and concepts of the present invention and generally designated by the reference numeral 10 will be described.

As best illustrated in FIGS. 1 through 6, the trailer hitch and tongue alignment system 10 generally comprises a vehicle-mountable apparatus 11 for mounting on a hitch ball support 12 of a vehicle. The vehicle-mountable apparatus 11 includes a first mount 14 for mounting to the hitch ball support 12. The first mount 14 comprises a ball receiving cup 16 for receiving the hitch ball 19 of the vehicle. The ball receiving cup 16 defines an internal cavity 18 for receiving the hitch ball 19.

A retaining means 20 may be provided for selectively retaining the ball receiving cup 16 on the hitch ball 19. The retaining means 20 comprises a ball engaging assembly 22. The ball engaging assembly 22 includes a hitch clamping bar 24 movable in the internal cavity 18 of the ball receiving cup 16. The ball engaging assembly 22 may move between an engaged position, adapted for engaging a hitch ball 19 located in the internal cavity 18, and a retracted position, adapted for permitting insertion and removal of a hitch ball 19 from the internal cavity 18.

A support rod 26 is provided for supporting the hitch clamping bar 24. The support rod 26 extends through a wall 28 of the ball receiving cup 16. The support rod 26 has a generally J-shaped configuration.

A mounting member 30 is mounted on an exterior 32 of the ball receiving cup 16. The mounting member 30 has a passage 34 therethrough. The support rod 26 extends through the passage 34 of the mounting member 30.

A portion of the support rod 26 has external threads 36 formed thereon. The external threads 36 extend through the mounting member 30. A securing member 38 has a channel 40 therethrough. The threaded portion 36 of the support rod 26 extends through the channel 40. The channel 40 has internal threads 42 for threadedly engaging the external threads 36 of the support rod 26.

A locator post 44 may be mounted to the first mount 14 for extending in a substantially vertical orientation when the first mount 14 is mounted on a hitch ball support. The locator post 44 has a primary portion for extending in a substantially vertical orientation. An offset portion extends between the primary portion and the ball receiving cup 16.

The locator post 44 may be telescopic. The primary portion of the locator post 44 comprises at least two telescopic sections 46, 47.

A light source 48 is adapted for selectively shining light. The light source 48 is mounted on an upper end 49 of the locator post 44. Preferably, the light source is powered by a battery 55.

A guide member 50 may be mounted on an upper end of the locator post 44. The guide member 50 comprises a cap 51. The cap 51 is mounted on the upper end 49 of the locator post 44.

A directing rod 52 of the guide member extends substantially perpendicular to the locator post 44. The light source 48 is mounted on the guide member 50. The light source 48 is designed to direct light in a direction opposite of the direction of the directing rod 52.

A switch 54 is provided for selectively activating the light source 48 when the tongue 60 of the trailer. The switch is located above the hitch ball 19 of the hitch ball support 12. The switch 54 is mounted on the locator post 44 and is preferably located on the primary portion above the offset portion.

The switch 54 has a button 56. The button 56 extends from the primary portion in a direction the same as a direction in which the offset portion extends from the primary portion. The button 56 is located such that positioning of the hitch ball receiver 17 of the trailer above the hitch ball 19 causes the hitch ball receiver 17 to actuate the button 56. In one embodiment of the invention, actuating the button causes the light source 48 to activate.

A trailer-mountable apparatus 58 is provided for mounting on the tongue 60 of the trailer adjacent to the hitch ball receiver 17 of the tongue 60. The trailer-mountable apparatus 58 includes a second mount 62 for mounting to the tongue 60 of the trailer. The second mount 62 preferably comprises a saddle 63 for embracing a portion of the tongue 60 of the trailer.

The saddle 63 may comprise a pair of clamp members 64, 65. The clamp members 64, 65 are pivotally mounted together for clamping on the tongue 60. Each of the clamp members 64, 65 may have an arcuate configuration. Each of the clamp members 64, 65 has first 66, 68 and second 67, 69 ends. The first ends 66, 68 of each of the clamp members 64, 65 are pivotally mounted together.

The second ends 67, 69 of the clamp members 64, 65 each have a notch 70, 71 for engaging a portion of the trailer tongue 60.

The second ends 67, 69 of the clamp members 64, 65 are biased toward each other for clamping onto the trailer tongue. The clamp members 64, 65 are preferably biased by a spring 72.

An indicator post 73 is mounted on the second mount 62. The indicator post 73 has an upper end 74 with a loop 75 mounted thereon. The loop 75 is adapted to receive the directing rod 52 of the locator post 44 when the trailer tongue 60 is longitudinally aligned with and moved toward the hitch ball support 12. The indicator post 73 is telescopic to permit extension and contraction of a length of the indicator post 73.

The relative heights of the locator and the indicator posts may be adjusted such that the directing rod is aligned with the loop, regardless of the relative heights of the hitch ball support and trailer tongue.

In one embodiment of the invention, especially useful when viewing out of a rear window of the vehicle is obstructed, a first portion 76 of the indicator post 73 is oriented substantially perpendicularly to a second portion 77 of the indicator post 73. Thus, the first portion 76 of the indicator post 73 extends laterally outward in a substantially horizontal orientation from the trailer tongue 60 when the second mount 62 is installed on a trailer tongue 60. The primary portion of the locator post 44 has a first part 78. The first part 78 is oriented substantially perpendicularly to a second part 79 of the locator post 44 such that the first part 78 of the primary portion of the locator post 44 extends laterally outward in a substantially horizontal orientation from the hitch ball support 12 when the first mount 14 is installed on a hitch ball support 12.

In use, the vehicle-mountable apparatus is coupled to the hitch ball attached to the hitch ball support on the vehicle. The user then couples the trailer mountable apparatus to the hitch ball receiver or tongue of the trailer. The user moves the vehicle in a rearward direction toward the trailer tongue. When the hitch ball receiver actuates the switch on the directing rod, the user sees the light source light up, indicating that the hitch ball and hitch ball receiver are now properly aligned. The user may then remove the alignment system and lower the hitch ball receiver onto the hitch ball.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A trailer hitch and tongue alignment system for mounting on a vehicle and a trailer to be hitched to the vehicle, the vehicle having a hitch ball support extending rearwardly from the vehicle and a hitch ball mounted on an upper surface of the hitch ball support bar, the trailer having a tongue with hitch ball receiver mounted at a forward end of the tongue, the hitch ball receiver having a hitch ball cavity for receiving the hitch ball, the system comprising:

a vehicle-mountable apparatus for mounting on the hitch ball support of the vehicle, the vehicle-mountable apparatus including:
a first mount for mounting to the hitch ball support;
a locator post mounted to the first mount for extending in a substantially vertical orientation when the first mount is mounted on a hitch ball support;
a light source for selectively shining light, the light source being mounted on an upper end of the locator post;
a switch for selectively activating the light source when the tongue of the trailer is located above the hitch ball of the hitch ball support, the switch being located on the locator post;
a trailer-mountable apparatus for mounting on the tongue of the trailer adjacent to the hitch ball receiver of the tongue;
wherein the trailer-mountable apparatus includes a second mount for mounting to the tongue of the trailer and an indicator post mounted on the second mount; and
wherein the second mount comprises a saddle for embracing a portion of the tongue of the trailer, the saddle comprising a pair of clamp members pivotally mounted together for clamping on the tongue, each of the clamp members having an arcuate configuration, each of the clamp members having first ends pivotally mounted together.

2. The system of claim 1, wherein second ends of the clamp members each have a notch for engaging a portion of the trailer tongue, the second ends of the clamp members being biased toward each other.

3. The system of claim 1, wherein the indicator post has an upper end with a loop mounted on the upper end and the locator post has a directing rod mounted thereon, the directing rod being oriented in a direction substantially perpendicular to an axis of the locator post such that the loop is adapted to receive the directing rod when the trailer tongue is longitudinally aligned with the hitch ball support.

4. The system of claim 1, wherein the indicator post is telescopic to permit extension and contraction of a length of the indicator post.

5. The system of claim 1, wherein a first portion of the indicator post is oriented substantially perpendicularly to a second portion of the indicator post such that the first portion of the indicator post extends laterally in a substantially horizontal orientation from the trailer tongue when the second mount is installed on a trailer tongue, and wherein the locator post has a first part oriented substantially perpendicularly to a second part of the locator post such that the first part of the locator post extends laterally in a substantially horizontal orientation from the hitch ball support when the first mount is installed on a hitch ball support.

6. The system of claim 1 wherein the first mount comprises a ball receiving cup for receiving the hitch ball of the vehicle, the ball receiving cup defining an internal cavity for receiving the hitch ball.

7. The system of claim 6 wherein the locator post has a primary portion for extending in a substantially vertical orientation, and an offset portion extending between the primary portion and the ball receiving cup.

8. The system of claim 6 additionally comprising a retaining means for selectively retaining the ball receiving cup on the hitch ball.

9. The system of claim 8 wherein the retaining means comprising a ball engaging assembly including a hitch clamping bar movable in the internal cavity of the ball receiving cup between an engaged position for engaging a hitch ball located in the internal cavity, and a retracted position for permitting insertion and removal of a hitch ball from the internal cavity.

10. The system of claim 9 wherein the ball engaging assembly includes a support rod for supporting the hitch clamping bar, the support rod extending through a wall of the ball receiving cup, the support rod having a generally J-shaped configuration.

11. The system of claim 10 wherein the ball engaging assembly includes a mounting member mounted on an exterior of the ball receiving cup, the mounting member having a passage therethrough, the support rod extending through the passage of the mounting member, a portion of the support rod having external threads formed thereon, the portion of the support rod having external threads extending through the mounting member.

12. The system of claim 11 wherein the ball engaging assembly includes a securing member having a channel therethrough, the threaded portion of the support rod extending through the channel, the channel having internal threads for threadedly engaging the external threads of the support rod.

13. The system of claim 1 additionally comprising a guide member mounted on an upper end of the locator post, the guide member comprising a cap mounted on the upper end of the locator post, and a directing rod extending substantially perpendicular to the locator post.

14. The system of claim 13 wherein the light source is mounted on the guide member, the light source being adapted to direct light in a direction opposite of the direction of the directing rod.

15. The system of claim 1 wherein the switch is mounted on primary portion of the locator post above an offsetting portion of the locator post.

16. The system of claim 15 wherein the switch has a button extending from the primary portion in a direction the same as a direction in which the offset portion extends from the primary portion, wherein the button is located such that positioning of the hitch ball receiver of the trailer above the hitch ball causes the hitch ball receiver to actuate the button.

17. A trailer hitch and tongue alignment system for mounting on a vehicle and a trailer to be hitched to the vehicle, the vehicle having a hitch ball support extending rearwardly from the vehicle and a hitch ball mounted on an upper surface of the hitch ball support bar, the trailer having a tongue with hitch ball receiver mounted at a forward end of the tongue, the hitch ball receiver having a hitch ball cavity for receiving the hitch ball, the system comprising:

a vehicle-mountable apparatus for mounting on the hitch ball support of the vehicle, the vehicle-mountable apparatus including:

a first mount for mounting to the hitch ball support, the first mount comprising:

a ball receiving cup for receiving the hitch ball of the vehicle, the ball receiving cup defining an internal cavity for receiving the hitch ball;

a retaining means for selectively retaining the ball receiving cup on the hitch ball, the retaining means comprising a ball engaging assembly including:

a hitch clamping bar movable in the internal cavity of the ball receiving cup between an engaged position for engaging a hitch ball located in the internal cavity, and a retracted position for permitting insertion and removal of a hitch ball from the internal cavity;

a support rod for supporting the hitch clamping bar, the support rod extending through a wall of the ball receiving cup, the support rod having a generally J-shaped configuration;

a mounting member mounted on an exterior of the ball receiving cup, the mounting member having a passage therethrough, the support rod extending through the passage of the mounting member, a portion of the support rod having external threads formed thereon, the portion of the support rod having external threads extending through the mounting member;

a securing member having a channel therethrough, the threaded portion of the support rod extending through the channel, the channel having internal threads for threadedly engaging the external threads of the support rod;

a locator post mounted to the first mount for extending in a substantially vertical orientation when the first mount is mounted on a hitch ball support, the locator post having a primary portion for extending in a substantially vertical orientation, and an offset portion extending between the primary portion and the ball receiving cup, the locator post being telescopic, the primary portion of the locator post comprising at least two telescopic sections;

a light source for selectively shining light, the light source being mounted on an upper end of the locator post;

a guide member mounted on an upper end of the locator post, the guide member comprising a cap mounted on the upper end of the locator post, and a directing rod extending substantially perpendicular to the locator post, the light source being mounted on the guide member, the light source being adapted to direct light in a direction opposite of the direction of the directing rod;

a switch for selectively activating the light source when the tongue of the trailer is located above the hitch ball of the hitch ball support, the switch being located on the locator post, the switch being mounted on the primary portion above the offset portion, the switch having a button extending from the primary portion in a direction the same as a direction in which the offset portion extends from the primary portion, wherein the button is located such that positioning of the hitch ball receiver of the trailer above the hitch ball causes the hitch ball receiver to actuate the button;

a trailer-mountable apparatus for mounting on the tongue of the trailer adjacent to the hitch ball receiver of the tongue, the trailer-mountable apparatus including:

a second mount for mounting to the tongue of the trailer, the second mount comprising a saddle for embracing a portion of the tongue of the trailer, the saddle comprising a pair of clamp members pivotally mounted together for clamping on the tongue, each of the clamp members having an arcuate configuration, each of the clamp members having first ends pivotally mounted together, second ends of the clamp members each having a notch for engaging a portion of the trailer tongue, the second ends of the clamp members being biased toward each other, the clamp members being biased by a spring;

an indicator post mounted on the second mount, the indicator post having an upper end with a loop mounted on the upper end, the loop being adapted to receive the directing rod of the locator post when the trailer tongue is longitudinally aligned with the hitch ball support, the indicator post being telescopic to permit extension and contraction of a length of the indicator post;

wherein a first portion of the indication post is oriented substantially perpendicularly to a second portion of the indicator post such that the first portion of the indicator post extends laterally outward in a substantially horizontal orientation from the trailer tongue when the second mount is installed on a trailer tongue, and wherein the primary portion of the locator post has a first part oriented substantially perpendicularly to a second part of the locator post such that the first part of the primary portion of the locator post extends laterally outward in a substantially horizontal orientation from the hitch ball support when the first mount is installed on a hitch ball support.

18. A trailer hitch and tongue alignment system for mounting on a vehicle and a trailer to be hitched to the vehicle, the vehicle having a hitch ball support extending rearwardly from the vehicle and a hitch ball mounted on an upper surface of the hitch ball support bar, the trailer having a tongue with hitch ball receiver mounted at a forward end of the tongue, the hitch ball receiver having a hitch ball cavity for receiving the hitch ball, the system comprising:

a vehicle-mountable apparatus for mounting on the hitch ball support of the vehicle, the vehicle-mountable apparatus including:

a first mount for mounting to the hitch ball support;

a locator post mounted to the first mount for extending in a substantially vertical orientation when the first mount is mounted on a hitch ball support;

a light source for selectively shining light, the light source being mounted on an upper end of the locator post;

a switch for selectively activating the light source when the tongue of the trailer is located above the hitch ball of the hitch ball support, the switch being located on the locator post;

wherein the first mount comprises a ball receiving cup for receiving the hitch ball of the vehicle, the ball receiving cup defining an internal cavity for receiving the hitch ball;

a retaining means for selectively retaining the ball receiving cup on the hitch ball;

wherein the retaining means comprises a ball engaging assembly including a hitch clamping bar movable in the internal cavity of the ball receiving cup between an engaged position for engaging a hitch ball located in the internal cavity, and a retracted position for permitting insertion and removal of a hitch ball from the internal cavity; and wherein the ball engaging assembly includes a support rod for supporting the hitch clamping bar, the support rod extending through a wall of the ball receiving cup, the support rod having a generally J-shaped configuration.

19. The system of claim 18 wherein the ball engaging assembly includes a mounting member mounted on an exterior of the ball receiving cup, the mounting member having a passage therethrough, the support rod extending through the passage of the mounting member, a portion of the support rod having external threads formed thereon, the portion of the support rod having external threads extending through the mounting member.

20. The system of claim 19 wherein the ball engaging assembly includes a securing member having a channel therethrough, the threaded portion of the support rod extending through the channel, the channel having internal threads for threadedly engaging the external threads of the support rod.

* * * * *